No. 817,897. PATENTED APR. 17, 1906.
J. B. BARTHOLOMEW.
STRAW STACKER.
APPLICATION FILED MAY 29, 1900. RENEWED NOV. 11, 1905.
2 SHEETS—SHEET 1.
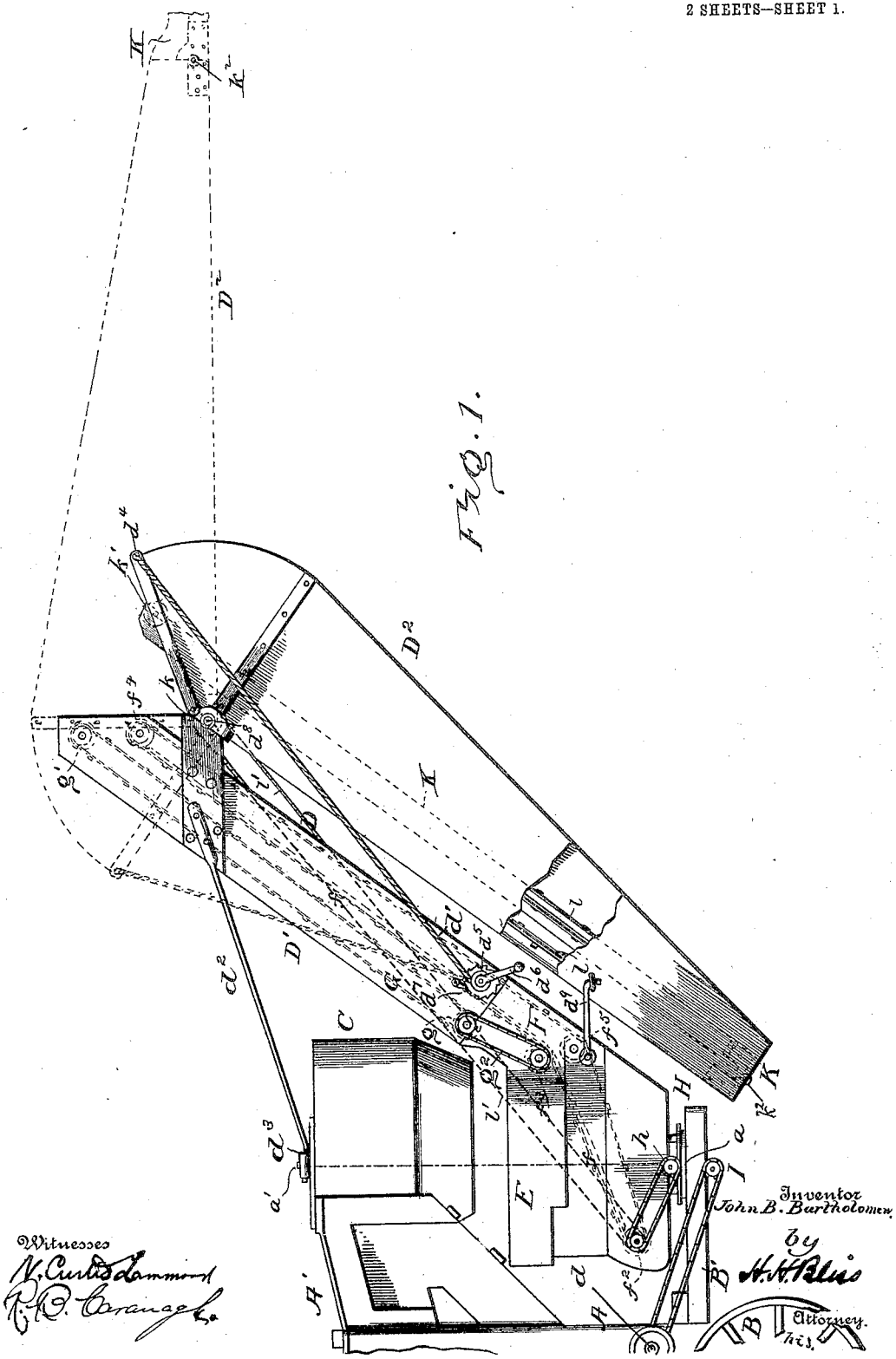

No. 817,897. PATENTED APR. 17, 1906.
J. B. BARTHOLOMEW.
STRAW STACKER.
APPLICATION FILED MAY 29, 1900. RENEWED NOV. 11, 1905.
2 SHEETS—SHEET 2.
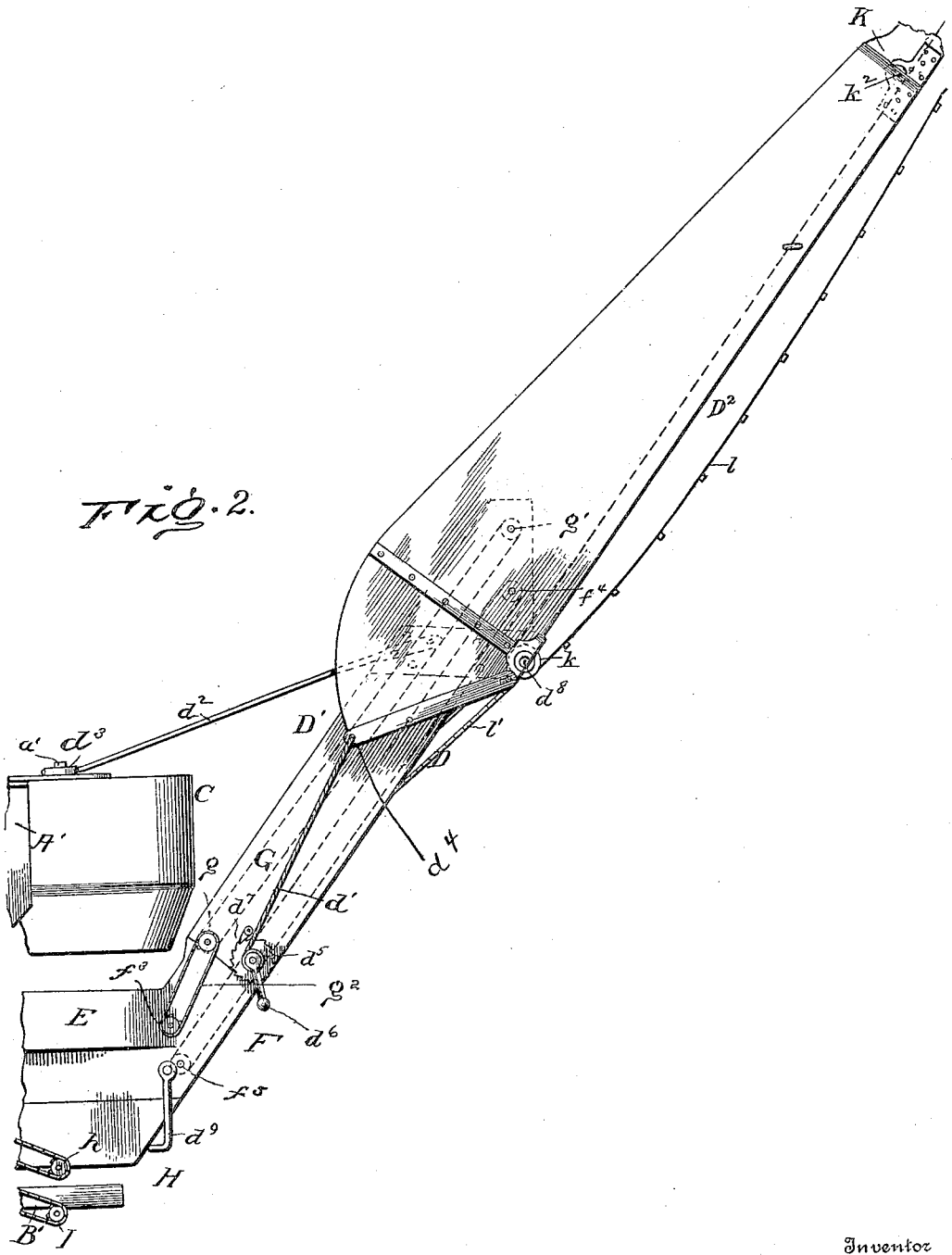
Witnesses
Albert K. Williams Jr.
N. Curtis Lammont
Inventor
John B. Bartholomew
by H. H. Bliss his Attorney.

UNITED STATES PATENT OFFICE.

JOHN B. BARTHOLOMEW, OF PEORIA, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

No. 817,897. Specification of Letters Patent. Patented April 17, 1906.

Application filed May 29, 1900. Renewed November 11, 1905. Serial No. 286,911.

*To all whom it may concern:*

Be it known that I, JOHN B. BARTHOLOMEW, a citizen of the United States, residing at Peoria, in the county of Peoria and State of Illinois, have invented certain new and useful Improvements in Straw-Stackers, of which the following is a specification, reference being had therein to the accompanying drawings.

Figure 1 is a side view showing the rear portion of a thresher or separator frame and an attached straw-stacking mechanism embodying my invention, the outer stacker-section being shown in full lines in its folded position and in dotted lines in one of its operative positions. Fig. 2 is a similar view showing the outer stacker-section in its extreme elevated operative position.

Referring to the drawings, A indicates the rear portion of a thresher or separator frame, supported by rear ground-wheels B.

A' is a supplemental frame extending rearwardly and by preference somewhat upwardly from the thresher-frame and constituting a chamber through which the threshed straw is delivered into an attached straw-receiving device or hood C, by which latter the straw is arrested and delivered downward by gravity to the lower end of the stacker.

B' indicates a supporting-frame, attached to and extending rearwardly from the lower part of the frame A and adapted to support by suitable pivoting devices having a vertical axis the lower end of the stacker. The stacker is indicated as a whole by D, and its inner section D' is attached to or forms a part of a horizontally-vibrating frame, the lower vertical pivot of which is mounted in or on the frame B', as already described, and the upper vertical pivot of which is mounted in or on the supplemental frame A' of the thresher above the straw-delivery means or opening of the latter. It will be understood that these pivots, the lower of which is indicated at $a$ and the upper at $a'$, are arranged in the same vertical line, said line being indicated in Fig. 1 between the points $a$ and $a'$. The upper part of the inner stacker-section D' is connected with said upper pivot $a'$ by an inwardly-extending frame member or bars $d^2$, having a bearing $d^3$ for the pivot. The outer or upper stacker-section is indicated at D² and is hinged to said inner section by a transverse horizontal shaft or pivot $d^8$ and is adapted to be adjusted in vertical planes by a draft device comprising a rope or ropes $d'$, connected at $d^4$ with the inner end of the section D², a suitable windlass or pulleys for said rope or ropes at $d^5$, an actuating-crank $d^6$ on said windlass or pulleys, and a ratchet-and-pawl locking device $d^7$. It will be understood, however, that various means may be employed for taking up and letting off the draft device to adjust or fold the outer stacker-section. The point or points of attachment $d^4$ of the draft device are remote from the hinge at $d^8$ and are so related thereto that during all of the operative positions of said outer section the draft device will act between the point $d^4$ and the taking-up mechanism at $d^5$ on a line which passes to the rear of the hinge $d^8$, whereby for all of its operative or stacking positions the outer stacker-section is fully controlled by the draft device from the relatively low point at which the operative mechanism $d^5\ d^6$ is situated and which is within convenient reach of a person standing on the ground, even to the extreme elevated position shown in Fig. 2. When, however, the outer stacker-section is lowered for folding, the line of the draft device will pass across the neutral point or line extending through the take-up device $d^5$ and hinge $d^8$, after which the take-up may be operated to shorten the draft device and draw the section D² against the rear side of the inner section. When so folded, the section may be secured by a latch $d^9$. The draft device by reason of its relation to the section D² and its hinge thus operates to draw said section in either of two directions.

The straw-carrying mechanism of the stacker comprises an inner elevating-belt F, having, preferably, a more or less nearly horizontal lower portion $f$ and a steeply-inclined part $f'$. While the straw-receiving part $f$ and the elevating part $f'$ may be independent, each part arranged and operated as a separate belt, I prefer to employ a single belt, as shown, the inner end of which is carried by a roller $f^2$, the upper end by a roller $f^4$ at or near the top of the section D', and the intermediate portion of which is guided and deflected by rollers $f^3\ f^5$ at the lower outer part of said section. The receiving part $f$ is arranged as the bottom of a straw-receiving hopper E on the stacker below the delivery-hood C, the parts C and E being substantially concentric with the line $a\ a'$. With the carrier $f'$ coöperates an underacting belt or drag G, carried by lower and upper rollers $g\ g'$, mounted on the stacker-section D'. It will be understood, however, that the principal features of my invention do not depend upon the particular construction of the straw receiving and elevating means, and the parts F and G may be considered as typical of any suitable straw elevator or carrier. The straw delivered between the rollers $g'\ f^4$ is received upon the inner end of a carrier-belt $l$, mounted on inner and outer rollers $k\ k'$, the latter being journaled in the part K of the outer stacker-section $D^2$, the shaft of the inner roller $k$ being substantially concentric with or constituting the hinge $d^8$.

The stacker-actuating mechanism comprises, first, a vibrating mechanism H, acting to oscillate or vibrate the stacker as a whole on the vertical axis $a\ a'$. This vibrating mechanism is or may be of known character, actuated by a transmitting mechanism I from a power-shaft $d$ of the thresher. It comprises also a stacker-belt-driving mechanism, of which $h$ is a transmitting mechanism taking power continuously from the mechanism H to the roller $f^2$ of the carrier or elevator F to drive the latter.

A chain-and-sprocket gearing $g^2$ drives the roller $g$ and the belt G from the shaft of roller $f^3$, and the roller $k$ and outer carrier $l$ are driven by a similar gearing $l'$ from the shaft of roller $f^2$.

The stacker-section $D^2$ is provided with an extreme outer section K, which latter carries the roller $k'$ of the carrier $l$ and is adapted to fold upon a transverse hinge $k^2$ against the face of the inner part of said section $D^2$, Fig. 1, whereby the down-folding of the long outer section $D^2$ without contact with the ground is permitted.

The considerable height of the section D' and the hinge $d^8$, with the corresponding length of the inner or main portion of the stacker-section $D^2$ and the additional length of the extreme outer section K, give great range and stacking capacity to the machine.

It will be understood that the point of attachment $d^4$ will be eccentric to or remote from the axis $d^8$ (somewhat above it) and adapted to move to the rear of the axis as the section swings below the horizontal.

The draft device has its points of attachment so related to the hinge $d^8$ that when the section $D^2$ is suspended by gravity from said hinge in a substantially vertical position the line of the draft device passes substantially through the axis of the hinge. This enables the exertion of a very moderate manual force to move the stacker-section outward, so that the draft device may act at the front of the hinge to elevate the section or inward, so that the draft device may act at the rear of the hinge to complete the folding of the section.

I have heretofore patented a straw-stacker carrier composed of two sections hinged together and supported by a rope attachment, such device being shown in my Patent No. 556,487, dated May 17, 1896. The form of the stacker there shown, however, differs radically from that herein claimed in several particulars, among which may be noted the following: The object of the earlier invention was to provide a straw-stacker carrier having two or more sections which are adapted to be supported in working position by a rope under such relationship that the steps incident to folding and unfolding could be accomplished without changing the length of the supporting-rope which was in use during such operation, and hence avoiding any winding or unwinding of the rope during the folding. The construction was such as to necessitate a vertical movement of both the lower and upper sections of the carrier whenever the carrier was folded or unfolded. It will thus be seen that there are essential differences between such earlier construction of mine and the construction herein disclosed and claimed, as the present construction requires the winding and unwinding of the supporting-rope during the folding and unfolding operations, whereas the earlier construction was for the purpose of avoiding such winding and unwinding, and in my earlier construction it was necessary that both of the sections of the carrier have a vertical movement relative to each other during the folding or unfolding operations, whereas in my present construction the lower section of the carrier has no vertical movement whatever when the carrier is being folded or unfolded.

I do not claim herein, broadly, a draft device which is adapted to pass across the hinge-axis of the outer section as the latter passes from folded to operating position, or vice versa, that being the subject of my Patent No. 706,214, dated August 5, 1902.

What I claim is—

1. In a straw-stacker, the combination of an inner stacker-section, a support for the same, an outer stacker-section vertically swingable on the inner section on a transverse axis and adapted to fold downward toward the rear of the inner section, and a draft device leading from the outer section to the inner section and connecting the said sections and arranged to pass across said axis of the outer section from the front to the rear of said axis as the outer section turns downward and forward, substantially as set forth.

2. In a straw-stacker, the combination of an inner stacker-section, a support for the same, an outer stacker-section vertically swingable on the inner section on a transverse axis and adapted to fold downward at the rear of the inner section, and a draft device leading from the outer section to the inner section independently of said support, connecting the said sections and arranged to pass across said axis of the outer section from the front to the rear of said axis as the outer section turns downward and forward toward the rear of the inner section, substantially as set forth.

3. In a straw-stacker, the combination of an inner stacker-section, a support for the same, an outer stacker-section vertically swingable on the upper part of the inner section on a transverse axis and adapted to fold downward at the rear of the inner section, and a draft device leading from the upper forward part of the outer section to the lower part of the inner section and directly connecting said sections, and arranged to pass across said axis of the outer section from the front to the rear of said axis as the outer section turns downward and forward, substantially as set forth.

4. In a straw-stacker, the combination of an inner stacker-section, a support for the same, an outer stacker-section vertically swingable on the inner section on a transverse axis and adapted to fold downward toward the rear of the inner section, and a draft device leading from the outer section directly to the inner section and arranged to pass across said axis of the outer section from the front to the rear of said axis as the outer section turns downward and forward, said inner section being swingable on its said support in horizontal planes and being rigidly held in vertical planes, substantially as set forth.

5. In a straw-stacker, the combination of an inner stacker-section, a support for the same, an outer stacker-section swingable vertically on the inner section on a transverse axis and adapted to fold downward toward the rear of the inner section, and a draft device leading from the outer section to the inner section and arranged to pass across from one side to the other of said axis of the outer section as the latter is swung, said outer section being formed in two parts hinged together, substantially as set forth.

6. In a straw-stacking mechanism, the combination of an inner stacker-section, means for supporting the same and for holding it from moving vertically while the outer section is being adjusted, an outer stacker-section extending from the upper end of said inner section and adapted to fold down at the rear side of the same, a hinge connecting said sections, and a draft device connecting the inner part of the outer section with a relatively fixed part, adapted to act at the front or at the rear of said hinge to operate the outer section and extending through the axis of said hinge when the outer section is suspended substantially vertically in a downward-hanging position.

7. In a straw-stacking mechanism, the combination, with a thresher-frame, of an inner horizontally-vibratable stacker-section, a vertical pivot for the same below the straw-delivery means or opening of the thresher and an upper vertical pivot for the same above said means or opening, an outer stacker-section hinged on the said inner section by a horizontal pivot or hinge and adapted to fold downward at the rear side of said inner section, and a draft device connecting the outer section with the inner section, the line of said draft device being to one side of the hinge-joint of said sections when the outer section is elevated and to the other side of said joint when it is folded downward.

8. In a straw-stacking mechanism, the combination, with a main thresher-frame, of a horizontally-vibrating frame mounted on said main frame, a straw-carrying device on the vibrating frame, an outer stacker-section hinged on said vibrating frame by a horizontal hinge or pivot, adapted to fold downward at the rear side of the same, and having straw-carrying means, and being formed of two parts, the outer of which is foldable on the inner part, and a draft device connecting said outer stacker-section with the vibrating frame, whereby the said section may be adjusted in vertical planes.

9. In a straw-stacking mechanism, the combination of an inner stacker-section, an outer stacker-section, a hinge uniting the sections, about which the outer section turns, and a draft device connected at one end with a relatively stationary part of the apparatus and at its other end with the said outer section, the point of connection of the draft device with the outer section being on a side of the said pivot diametrically opposite that of, the connection with the said stationary part and being arranged to carry the draft device across the pivot as the outer section moves from a working position to the folding position and vice versa, whereby the draft device is arranged to both fold the outer section and to adjust it in different working positions by a draft or pulling action, substantially as set forth.

10. In a straw-stacking mechanism, the combination of an inner stacker-section, which is held rigid from movement in vertical planes, an outer stacker-section connected with the inner section to swing in vertical planes thereon and to fold down against the rear part of the inner section, and an operating connection extending from the inner section to the outer section for moving the latter, said operating connection being arranged to cross the line of said hinge as the outer section swings in vertical planes, substantially as set forth.

11. In a straw-stacker, the combination with a supporting-frame, of an inner, upwardly-inclined, backwardly-extending stacker-section, straw-carrying means arranged in the inner section of the carrier and comprising underacting and overacting endless belts arranged to discharge the straw at the upper end of the stacker-section, an outer section connected to the upper end of the inner section by a horizontal hinge and arranged to fold downward and toward the rear of the inner section, and provided with straw-carrying means that take the straw from the discharge end of the inner section, and means for adjusting in vertical planes the outer section relative to the inner section and for folding it against the under rear side thereof, substantially as set forth.

12. In a straw-stacker, the combination with a threhser provided with rearward-extending supports for the stacker arranged respectively above and below the thresher discharge-opening, of an inner stacker-section connected respectively with the said supports of the thresher by vertical pivots or hinges, straw-carrying means comprising a section or part arranged below the discharge-opening of the thresher and an upwardly, rearwardly extending section or part comprising underacting and overacting belts arranged to discharge at the outer upper end of the inner stacker-section, an outer stacker-section connected with the inner section near its upper end by a horizontal hinge and arranged to fold downward and toward the rear of the inner section, and provided with straw-carrying means that take the straw from the discharge end of the upper section, and means for adjusting the outer stacker-section relative to the inner section and for folding it against the under rear side thereof, substantially as set forth.

In testimony whereof I affix my signature in presence of two witnesses.

JOHN B. BARTHOLOMEW.

Witnesses:
 N. CURTIS LAMMOND,
 RICHARD B. CAVANAGH.